United States Patent Office 2,746,066
Patented May 22, 1956

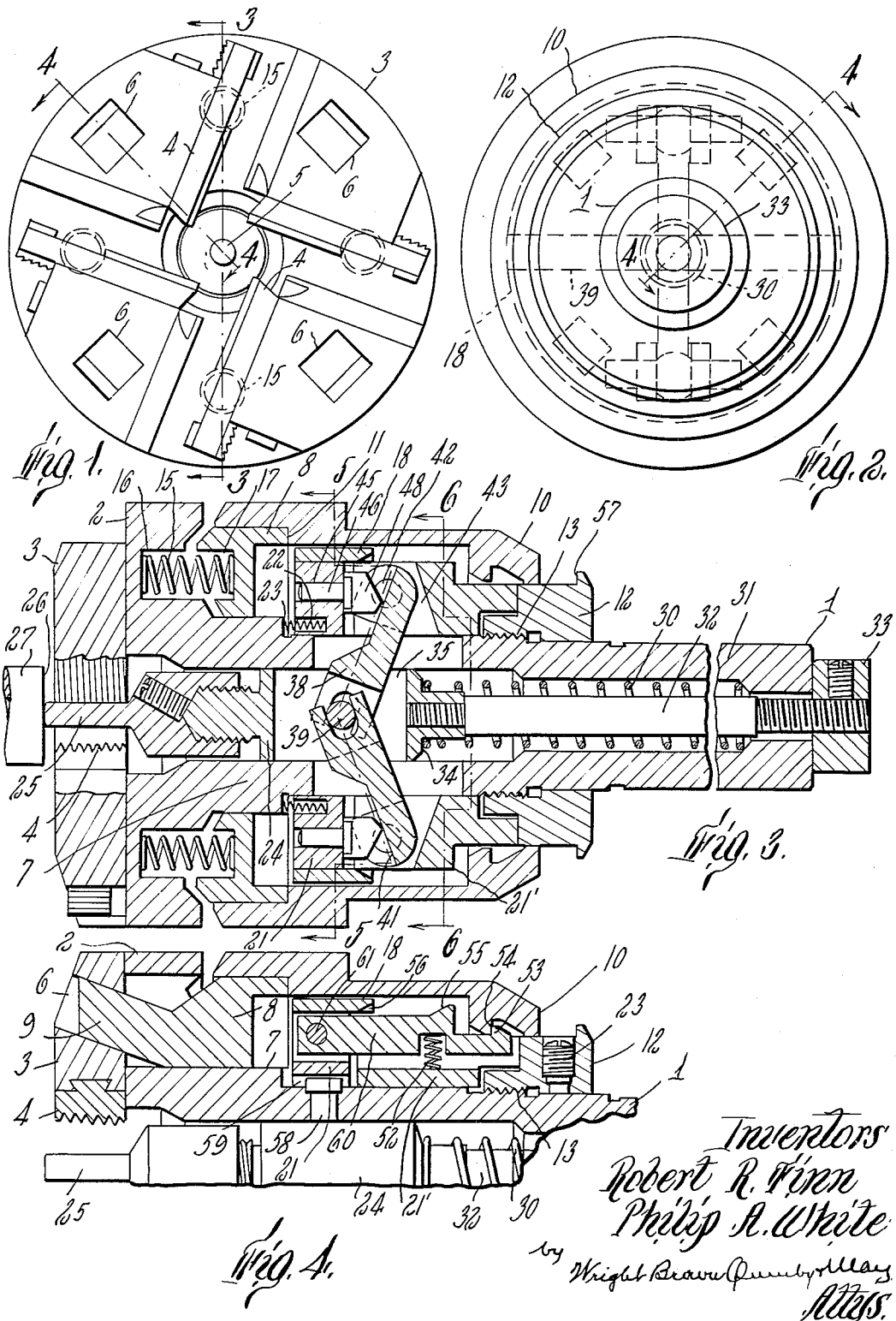

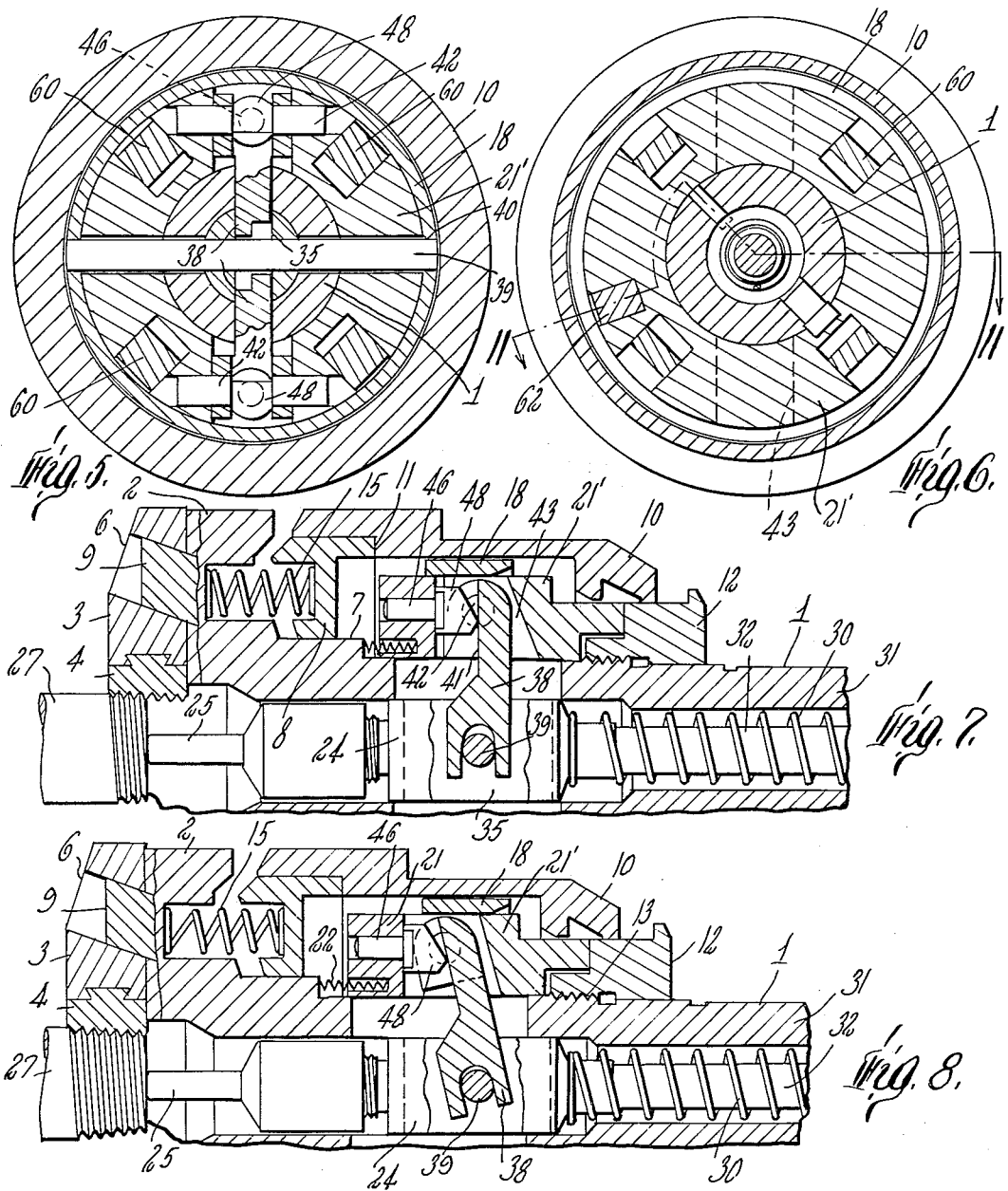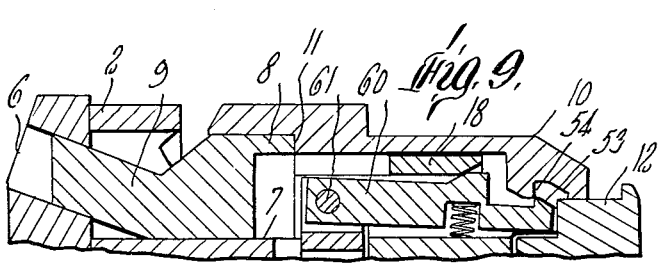

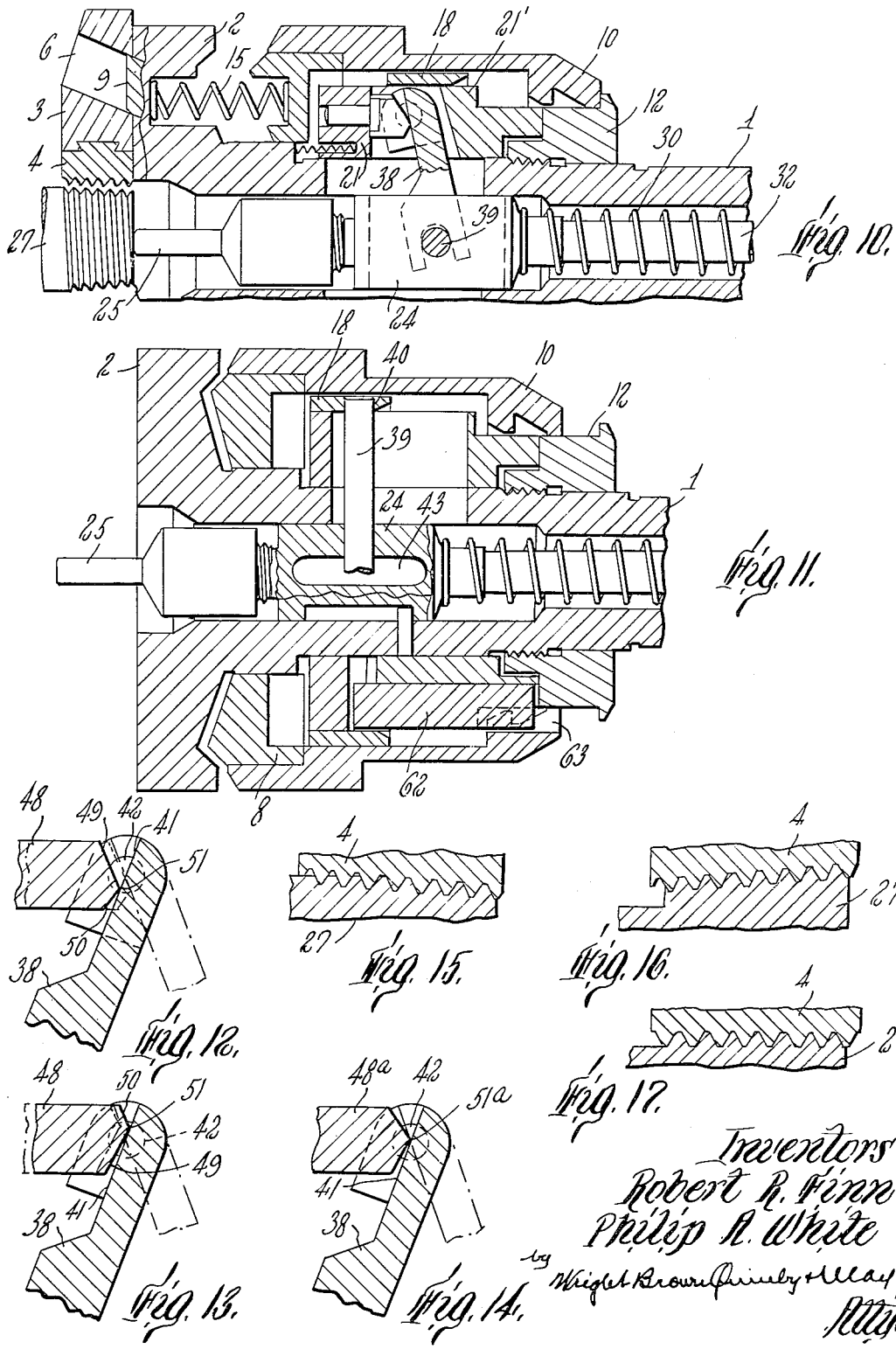

2,746,066

COLLAPSIBLE THREADING DIE FOR SELECTIVELY CUTTING STRAIGHT OR TAPER THREADS

Robert R. Finn and Philip A. White, Springfield, Vt., assignors to Jones & Lamson Machine Company, Springfield, Vt., a corporation of Vermont Application May 12, 1953, Serial No. 354,492

7 Claims. (Cl. 10—95)

This invention relates to dies for cutting threads, and has for one object a die which can be made to cut straight or tapered threads, and where tapered threads are cut in which the taper may be selectively either positive or negative.

A further object, when the die is arranged for cutting tapered threads, is to provide for gradual in or out motion of the chasers during the cutting, thus avoiding the formation of rough shoulders on the flanks of the cut threads where the individual chaser points stop cutting, which has been characteristic of tapered threads cut by dies as previously made.

For a complete understanding of this invention, reference may be had to the accompanying drawings in which Figure 1 is a front elevation of a thread cutting die embodying the invention.

Figure 2 is a rear elevation of the same.

Figures 3 and 4 are sectional views on the lines 3—3 and 4—4, respectively, of Figures 1 and 2, the die being arranged to cut positive taper.

Figures 5 and 6 are detail sectional views on lines 5—5 and 6—6, respectively, of Figure 3.

Figures 7 and 8 are views similar to a portion of Figure 3, but showing the parts in successive portions of a thread cutting operation.

Figure 9 is a view similar to Figure 4, but showing the parts just prior to completion of thread cutting.

Figure 10 is a view similar to Figures 7 and 8 but with the parts in open position at the end of the thread cutting.

Figure 11 is a sectional view on line 11—11 of Figure 6.

Figure 12 is similar to a portion of Figures 7, 8 and 10 but with the parts in different relative positions.

Figures 13 and 14 are views similar to Figure 12, but showing the parts arranged for negative taper threading and for straight threading, respectively.

Figures 15, 16 and 17 are diagrammatic views showing the relations between the die and the work corresponding to Figures 12, 13 and 14, respectively.

At 1 is shown a cylindrical body member having at its forward end an outwardly extending annular flange 2, the forward face of which is grooved laterally to provide ways, four being shown, in which are slidable chaser holders 3, each having a thread cutting chaser 4 secured to its inner face. It is evident that as the holders 3 are moved from or toward a central axis 5 of the body, the chasers will be brought outwardly or inwardly toward this axis. Each of the chaser holders has a slideway 6 therethrough which is inclined outwardly from the axis 5 and from its inner to its outer face.

The body 1 has an external annular face 7 on which is slidably mounted for motion in the direction of the axis, a chaser actuator member 8, having an outwardly and forwardly inclined cam portion 9 which rides within the way 6 of each of the chaser holders. The member 8 is held within an annular casing member 10 to move therewith, the rear end of the member 8 butting against an annular shoulder 11 therein. The member 10 is slidably guided for motion in the direction of the axis 5 on the member 8 and on a collar 12 threaded on the body 1 at 13 and held in position as by a set screw 23 (see Figure 4). By axial motion of the member 8 to the right as viewed in Figures 3, 10 and 11, it will be evident that the cam portions 9 engaging in the ways 6 will move the chaser holders across the end face of the flange 2 outwardly from the axis 5, and conversely sliding motion of the member 8 to the left will move the holders 3 inwardly toward the axis of the body.

Means are provided tending to force the members 8 and 10 rearwardly, thus to open the chasers, such means comprising a plurality of coil springs 15, four being shown, each seated in a recessed socket 16 in the rear face of the flange 2, their opposite ends bearing upon the bases of similar sockets 17 formed in the outer end wall of the member 8.

The body 1 is hollow, and slidably mounted therein is a plunger 24 to the forward end of which a stop 25 is secured. This stop 25, when the die is in use, engages the end 26 of the workpiece 27 which is being threaded. As the threading action progresses the body and parts carried thereby slide forwardly over the plunger 24. The plunger and stop are normally projecting at some distance forwardly from the forward end of the die, being so positioned by a spring 30 seated in a tubular portion 31 of the body and surrounding a shank member 32 threaded into the rear end of the plunger. Stops of various lengths may be substituted for that shown, each being chosen for the particular length of thread to be cut. A nut 33 secured on the threaded extremity of the shank member 32, may engage the rear end of the body 1 as shown in Figure 3 to limit the forward position of the stop 25 relative to the body 1. The forward end of this spring 30 bears against a shoulder 34 forwardly of the rear end of the plunger member 24. Forwardly of this shoulder 34, the plunger 24 is provided with a transverse slot 35 within which extend the inner forked extremities of a pair of levers 38 which bear over a pivot pin 39 which extends through the body 1 and is fixed in opposed perforations 40 in a ring 18 in the casing. The inner ends of the levers 38 are cut away so that they overlap within the slot 35 and beyond their overlapped portions they are widened to substantially fill the width of the slot 35 to be guided thereby, as shown in Figure 5. The outer ends of these levers 38 are provided with flat forward faces 41 and each is secured to a pin 42 journaled in a slot 43 in a tubular member 21' on which the ring 18 is axially slidable. This member 21' is normally pressed back against the collar 12 as by springs 22 which react between the forward face of a ring member 21. This ring member 21 carries headed members 48 engaging faces 41 of levers 38, thereby urging tubular member 21' against collar 12. Thus tubular member 21' moves with the body 1 and the pins 42 also normally move with the body 1. Since the pivot pin 39 is carried by the ring 18 and also by the plunger 24, as the threading progresses, the pins 42 are moved forwardly from their positions shown in Figure 3 successively into the positions shown in Figures 7 and 8, thus turning the levers 38 about the axes of the pins 42, while the ring 18 is held stationary through its connection with the pin 39.

The ring member 21 is provided with a pair of diametrically disposed parallel holes 45 within which may be located the shanks 46 of a pair of headed members 48. The heads of each of these members has a pair of tapered rear faces 49 and 50 meeting in an angle at 51, this angle resting upon the forward flattened face of one of the levers 38 opposite to its pin 42.

It will now be apparent that with the apex 51 of a member 48 engaging its lever 38 inwardly of its center of rocking at the pin 42, the movement of the levers 38 from the angular position of Figure 3 at the start of a threading operation through the angular position of Figure 7 and to the angular position of Figure 8, will allow the members 48 to move slightly to the right. This allows the springs 15 to move the chaser holder actuator 8 to the right, thus gradually opening the chasers by reason of the inclined portions 9 of the chaser holder actuator moving to the right. Thus as the threading progresses the chasers are allowed to open gradually, thus producing a tapered thread.

This action takes place until a latch mechanism, shown best in Figures 4 and 9, allows the die to open completely. Four of these latch devices are shown in Figures 5 and 6. Each comprises a latch element 60 (see Figures 4 and 9) pivoted at 61 at its forward extremity to the member 21 and urged outwardly, as by a spring 52, to bring its outer face into engagement with the inner face of the member 10 in the position shown in Figure 4, in which position a shoulder 53 on the latch member engages a shoulder 54 of the member 10. An outwardly inclined portion 55 of each latch 50 is positioned to be engaged by a matingly inclined face 56 on the rear edge of the ring 18 when the die has been moved sufficiently far onto the workpiece from the position of Figure 4 to that of Figure 9, until the shoulder 53 is moved out of contact with the shoulder 54, whereupon the springs 15 retract the member 8 until the rear end of the member 10 strikes an annular shoulder 57 on the collar 12, thus fully retracting the chasers and fully opening the die.

If it is desired to cut a reverse taper, it is only necessary to reverse the heads 48 so that the apex 51 engages outwardly of the central axis of its pin 42, thereupon turning of the levers 38 from the starting position of Figure 10 to the position of Figure 7, and then to the position of Figure 8, causes the member 10 with its actuator 8 to move outwardly, thus closing the chasers inwardly as the threading progresses. This is shown, for example, in Figure 13 where the starting angular position of one of the levers 38 is shown in full lines, its final position being shown in dotted lines, with the corresponding positions of the member 48.

When it is desired to thread straight, that is, without a taper in either direction, a member 48a having its apex 51a engaging the lever 38 at the axis of the pin 42 may be employed, whereupon the angular motion of the lever 38 is ineffective to cause motion of the member 10 with its chaser actuator 8 in either direction.

Figures 15, 16 and 17 show the corresponding thread cutting for positive taper, negative taper, and straight, respectively.

The member 21 is keyed against rotation relative to the body 1 as by a headed pin 58 seated in the body 1 and with its head riding in an internal key slot 59 in the member 18 as shown best in Figure 4. The member 10 is keyed against rotation relative to the tubular member 21' as by a key 62 in the member 12 riding in a keyway 63 in the member 10, as shown in Figures 6 and 11. The pin 39 holds the ring 18 in fixed angular position.

From the foregoing description it will be evident to those skilled in the art that various changes and modifications may be made therein without departing from the spirit or scope of the invention.

We claim:

1. A die comprising a body having an axis, chaser holders movably carried by said body for motion toward and from said axis, a chaser carried by each holder, a member movably carried by said body for motion in the direction of said axis and operatively connected to said holders to move said holders away from said axis on movement of said member in one direction and to move said holders toward said axis on movement of said member in the opposite direction, a stop movable with and relative to said body and stopped by impingement on a workpiece to be threaded as said body is moved axially relative to said workpiece during threading of the workpiece, and means operatively connecting said stop and member causing the continued motion of said body onto the workpiece after the stopping of said stop by contact with the workpiece for selectively controlling relative in or out motions between said chasers and workpiece, said means comprising an element connected for rocking motion by a relative motion between said stop and member and an abutment operatively connected to said member and bearing on said element selectively on one or the other side of its rocking axis.

2. A die comprising a body having an axis, chaser holders movably carried by said body for motion toward and from said axis, a chaser carried by each holder, a member movably carried by said body for motion in the direction of said axis and operatively connected to said holders to move said holders away from said axis on movement of said member in one direction and to move said holders toward said axis on movement of said member in the opposite direction, a stop movable with and relative to said body and stopped by impingement on a workpiece to be threaded as said body is moved axially relative to said workpiece during threading of the workpiece, and connections between said stop and member for causing the continued motion of said body onto the workpiece after the stopping of said stop by contact with the workpiece to move said member relatively to said body in the direction for gradually closing said chasers as thread cutting of the work progresses to thereby cut negative tapered threads on said workpiece, and means effective after a predetermined length of threading has been produced to move said member quickly in the opposite direction and open said die.

3. A die comprising a body having an axis, chaser holders movably carried by said body for motion toward and from said axis, a chaser carried by each holder, a member movably carried by said body for motion in the direction of said axis and operatively connected to said holders for moving said member in one direction to move said holders away from said axis on movement of said member in one direction and for moving said holders toward said axis on movement of said member in the opposite direction, a stop movable with and relative to said body and stopped by impingement on a work piece to be threaded as said body is moved axially relative to said work piece during threading of the work piece, and means operatively connecting said stop and member causing the continued motion of said body onto the work piece after the stopping of said stop by contact with the work piece to control relative out motions between said chasers and work piece thus to gradually open said chasers as thread cutting of the work progresses to thereby cut tapered threads on said work piece, said means comprising an element connected for rocking motion by relative motion between said stop and member, and an abutment operatively connected to said member and bearing on said element on one side of its rocking axis.

4. A die comprising a body having an axis, chaser holders movably carried by said body for motion toward and from said axis, a chaser carried by each holder, a member movably carried by said body for motion in the direction of said axis and operatively connected to said holders for moving said member in one direction to move said holders away from said axis on movement of said member in said one direction and to move said holders toward said axis on movement of said member in the opposite direction, a stop movable with and relative to said body and stopped by impingement on a work piece to be threaded as said body is moved axially relative to said work piece during threading of the work piece, connections between said stop and member causing the continued motion of said body onto the work piece after the stopping of said stop by contact with the work piece to move said member relatively to said body selectively in either direction to produce relative in or out motions between said chasers and work piece, and means operating on said member and effective after a predetermined length of thread has been cut for moving said member in the one direction to open said chasers to terminate the thread cutting operation, said connections comprising a lever connected for rocking motion by relative motion between said stop and member, and an abutment operatively connected to said member and bearing on said element on one side of its rocking axis.

5. A die comprising a body having an axis, chaser holders movably carried by said body for motion toward and from said axis, a chaser carried by each holder, a member movably carried by said body for motion in the direction of said axis and operatively connected to said holders to move said holders away from said axis on movement of said member in one direction and to move said holders toward said axis on movement of said member in the opposite direction, a stop movable with and relative to said body and stopped by impingement on a work piece to be threaded as said body is moved axially relative to said work piece during threading of the work piece, connections between said stop and member causing the continued motion of said body onto the work piece after the stopping of said stop by contact with the work piece to move said member relatively to said body selectively in either direction to produce relative in or out motions between said chasers and work piece, means effective after a predetermined length of thread has been cut for operatively disconnecting said stop and member, and means effective on said operative disconnection for moving said member to chaser-open position, said connections comprising a lever connected for rocking motion by relative motion between said stop and member, and an abutment operatively connected to said member and bearing on said lever selectively on one or the other side of its rocking axis.

6. A die comprising a body having an axis, chaser holders carried by said body for motion toward and from said axis, a chaser carried by each holder, a member movably carried by said body for motion in the direction of said axis and, means operatively connecting said member to said holders to move said holders away from said axis on motion of said member relative to said body in one direction and toward said axis on motion of said member relative to said body in the opposite direction, a stop movable with and relative to said body and stopped by impingement upon a work piece to be threaded while said body continues to move relative to said work piece, said means including a member rockably carried by said body, a lever carried by said rocking member and operatively engaged by said stop to turn said rockable member during the continued motion of said body after motion of said stop has been stopped by engagement with the work piece, and an element carried by said first mentioned member and engaging said rockable member on one or the other side of the axis of said rockable member, whereby said first mentioned member is moved relatively to said body by continued motion of said body after the stopping of said stop in one or the other direction depending upon which side of the axis of rocking of said rockable member said element engages to thereby move said first mentioned member relatively to said body in a direction to open or close said die as said threading progresses.

7. A die comprising a body having an axis, chaser holders carried by said body for motion toward and from said axis, a chaser carried by each holder, a member movably carried by said body for motion in the direction of said axis and, means operatively connecting said member to said holders to move said holders away from said axis on motion of said member relative to said body in one direction and toward said axis on motion of said member relative to said body in the opposite direction, a stop movable with and relative to said body and stopped by impingement upon a work piece to be threaded while said body continues to move relative to said work piece, said means including a member rockably carried by said body, a lever carried by said rocking member and operatively engaged by said stop to turn said rockable member during the continued motion of said body after motion of said stop has been stopped by engagement with the work piece, an element carried by said first mentioned member and engaging said rockable member on one or the other side of the axis of said rockable member, whereby said first mentioned member is moved relatively to said body by continued motion of said body after the stopping of said stop in one or the other direction depending upon which side of the axis of rocking of said rockable member said element engages to thereby move said first mentioned member relatively to said body in a direction to open or close said die as said threading progresses, means effective on threading of a work piece to the desired extent to release said first mentioned member from said body, and spring means connected to said member and biased to open said die effective on such release to move said first mentioned member to chaser open position.

References Cited in the file of this patent
UNITED STATES PATENTS

| 2,219,316 | Hogg | Oct. 29, 1940 |
| 2,501,601 | Finn | Mar. 21, 1950 |